United States Patent [19]

Forshufvud et al.

[11] 4,199,256
[45] Apr. 22, 1980

[54] OPTICAL SYSTEM

[75] Inventors: Ragnar Forshufvud; Arnold Johansson, both of Karlskoga, Sweden

[73] Assignee: Aktiebolaget Bofors, Bofors, Sweden

[21] Appl. No.: 856,874

[22] Filed: Dec. 2, 1977

[30] Foreign Application Priority Data

Dec. 2, 1976 [SE] Sweden ................. 7613513

[51] Int. Cl.² .............................................. G01C 1/00
[52] U.S. Cl. .................................. 356/247; 356/141; 356/152
[58] Field of Search ............... 356/141, 142, 143, 152, 356/245; 350/10, 194

[56] References Cited

U.S. PATENT DOCUMENTS

| | | | |
|---|---|---|---|
| 3,672,607 | 6/1972 | Stauff et al. | 244/3.16 |
| 3,699,341 | 10/1972 | Quillinan et al. | 356/152 X |
| 3,820,742 | 6/1974 | Watkins | 244/3.11 |
| 3,845,276 | 10/1974 | Keudy et al. | 235/61.5 S |

Primary Examiner—John K. Corbin
Assistant Examiner—Matthew W. Koren
Attorney, Agent, or Firm—Pollock, Vande Sande & Priddy

[57] ABSTRACT

An optical system for determining the angular deviation of a movable object from a pre-selected target, wherein an objective lens projects an image of the target in a first focal plane and projects an image of the movable object in a further focal plane. A prism divides the images, with the target image being tramsmitted to an ocular and the movable object image being transmitted to a detector.

14 Claims, 5 Drawing Figures

OPTICAL SYSTEM

BACKGROUND OF THE INVENTION

The present invention relates to an optical system capable of achieving a line of sight with a specific point and including a measuring device for detecting the angular deviation of a radiation source from a line of sight with the point.

The invention is particularly intended to be used when determining the angular deviation of a remote object from the line of sight of an object or target to be tracked. In such cases the optical system is usually directed towards a point on the object to be followed. If the object whose angular deviation is to be determined, emits radiation, the angular deviation of the radiation source from the line of sight to the object can be determined by a measuring device. The radiation can be generated by a radiation source located within a housing of the remote object, or it can be generated by its propulsion motor, in which case the transmitted radiation takes the form of an infrared radiation. The radiation may also, however, be derived from reflector arranged on the remote object. In such a case the radiation is transmitted towards the remote object from a radiation source located at the site of the optical system.

A particularly interesting and advantageous application for the present invention is in combination with an optical sight of the type comprising a tracking telescope with cross hairs or other visual sight reference symbols employed to point at and follow a target, and a measuring device which collects the radiation emitted by a moving object and determines the deviation of the object from the line of sight with the target.

It is previously known in the art to provide the measuring device with a movable measuring mask located in an image plane of an optical system so that the radiation emitted by the radiation source alternatingly passes through the mask and is prevented from penetrating the mask.

The movable mask may consist of a glass surface having a coating layer superimposed thereon. The layer may take a form such that information regarding the position of the radiation source can be derived from the relation between the occuring fluctuations of the radiation and the angular position of the measuring mask.

It is also previously known to employ an optical system having a tracking telescope comprising an objective lens, ocular and a sighting symbol, along with some type of cross hairs comprising thin lines on a glass surface located in the image plane of the objective. By means of the ocular, it is possible for the operator to view the target and its background and by means of control knobs etc, it is possible for the operator to point and maintain the symbol in line of sight with the target during the target tracking operation.

Because of the fact that two different main functions, ie. aiming and position measuring, have to be effectuated, it has up until now been necessary to use two different optical systems, ie an optical system for aiming and an optical system for measuring the position of the object. In order to attain an acceptable accuracy in the measuring operation, it is important that the relative position of the measuring and the aiming devices, respectively, is not influenced by mechanical deformations, temperature changes etc. A disturbance of an optical or mechanical element may cause a change of the relative position of the two optical systems making up the sighting system. As a result measuring systems are, in order to obtain an acceptable measuring accuracy, generally provided with means to control and adjust the line of sight of the telescope and the axes of the measuring device.

OBJECTS OF THE PRESENT INVENTION

Accordingly it is an object of the present invention to provide an optical system which eliminates the above discussed drawbacks confronting the prior art. The invention distinguishes from the prior art in that the optics of the optical system is common for both the sighting and position measuring functions. This means that every change in the optical system gives rise to the same changes in both of the devices, while the relative position is unchanged. As a result, any control or adjusting means for maintaining the optics of each system is not required.

BRIEF DESCRIPTION OF THE DRAWINGS

The present invention will in the following be described in more detail with reference to the accompanying drawings, in which FIG. 1 schematically illustrates the optical system in which the radiation paths are indicated.

DETAILED DESCRIPTION OF THE PREFERRED EMBODIMENT

Figure 1:
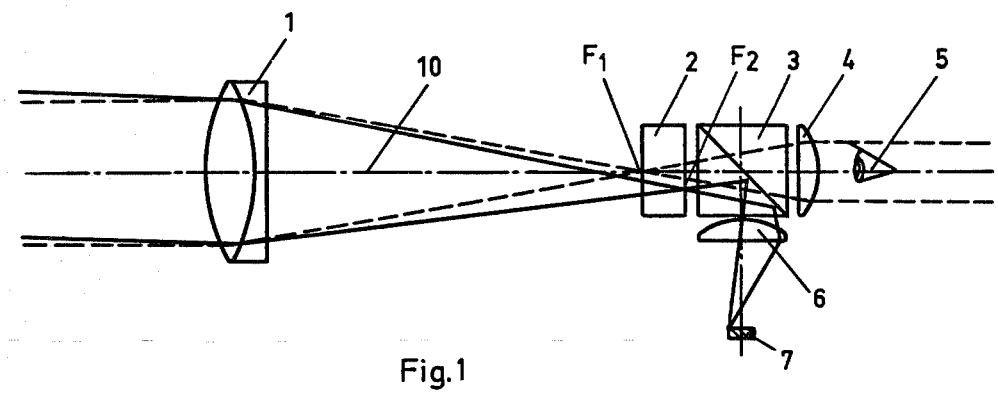

FIG. 1 schematically illustrates the optical system formed according to the invention. The optical system is particularly suitable to be included in an optical sight unit and for purposes of explanation only, the present invention will be described in conjunction with an optical sight. The task of such a sighting assembly is to point at, follow a target and while also collecting the radiation emitted by a movable object in order to compare the trajectory of the movable with the line of sight and determine the deviation between them. The manner of how the measuring operation is performed is immaterial to the operation of the present invention. Nevertheless, the deviation determined by the measuring operation is converted into an electrical signal and how this signal is processed and evaluated is immaterial to the operation of the present invention.

The optical system forming the present invention includes a single entrance aperture with an objective lens 1, a glass plate 2 and a prism 3 to split up the visual light from the target and its background and the radiation emitted by the radiation source of the object. The radiation source may for instance consist of a laser source, preferably a laser diode, disposed on the object in such a way that laser radiation is transmitted towards the optical system. The objective lens 1 collects both visual light and laser radiation and is designed in such a way that the focal distance for visual light and diode laser radiation is different. From this it directly follows that an image of the target and its background is projected in the image plane $F_1$ for visual light, while an image of the radiation source is projected in another image plane $F_2$ for diode laser radiation. In FIG. 1 the ray path of the visual light is indicated by dotted lines, while the laser radiation is indicated by continous lines. The ray paths are split up in the prism 3 in a conventional so that visual light passes through the prism and out through an ocular 4 to the eyes of an operator, with the laser radiation, however, being reflected by the prism 3 and passing through a lens system 6 to a detector 7.

In order to facilitate the tracking operation the optical system is provided with a visual sight reference symbol which consists of thin lines on a glass surface located in the image plane $F_1$ so that the operator is able to view the target and its background together with the visual sight reference symbol in the ocular 4. The symbol may consist of conventional cross hairs, but can also consist of one or more concentric circles 8 or arcs 9, see FIG. 3, having the line of sight 10 as the origin.

The embodiment employing concentric circles is preferred in comparison with conventional cross hairs when a measuring mask as discussed hereafter rotates with the line of sight as the origin. The lines of the visual reference symbol must be so thin that they do not disturb the measuring device by blocking the light rays.

Figure 4:
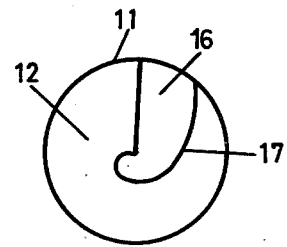
FIG. 4 illustrates the measuring device.

For determining the angular deviation of the movable radiation source from the line of sight the optical system to the target, there is provided a measuring device including a movable measuring mask 11, see FIG. 4, located in the image plane $F_2$. The measuring mask may consist of a glass surface having a dichroic layer in the form of a geometrical pattern superimposed thereon, which layer is transparent to visual light but opaque to laser radiation emitted by the radiation source. The measuring mask must have such properties that it does not disturb the visual image and the visual sight reference symbol even when the measuring mask is moved.

The distance between the two image planes $F_1$ and $F_2$ is so large that the obscuring effect caused by the lines of the visual sight reference symbol is small at the same time as the measuring mask and the visual sight reference symbol are disposed at the same optical element, for instance on each side of the glass plate 2 on the side surfaces which coincide with the planes $F_1$ and $F_2$. As the glass plate is common for both the sighting and position measuring functions, every change in the optical system gives rise to the same changes in both of the devices, while the relative position of the two sets of rays is unchanged. Any means for controlling and adjusting the line of sight and the axes of the measuring device are not required.

Figure 2:
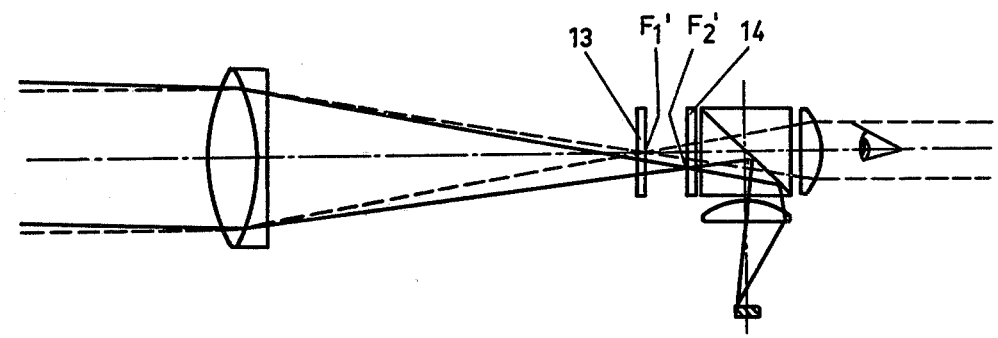
FIG. 2 illustrates an alternative embodiment of the optical system formed according to the present invention

Instead of one common glass plate, two thin glass plates 13, 14 can be used, see FIG. 2, in which case the image plane $F_1'$ for the visual light preferably coincides with that surface of the glass plate 13 which faces the operator. The image plane $F_2'$ for the laser radiation is by analogy required to coincide with that surface of the glass plate 14, which is facing the detector 7. Also, other embodiments with two glass plates are possible, however, the only condition that must be considered is that the glass surfaces on which the visual sight reference symbol and the measuring mask, respectively, are applied coincide with the associated image plane and that both of the glass plates are so connected that they cannot be moved horizontally and vertically relative to each other. For the sighting function, it is necessary that the glass plate 14 rotate. The glass plate 13 can be rigidly connected with the glass plate 14 and rotate with the same number of revolutions but it may also be stationary in which case the visual sight reference symbol may consist of cross hairs.

Figure 3:
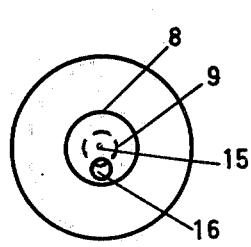
FIG. 3 illustrates the means for facilitating the aiming of the system.

FIG. 3 shows a view of the glass surface located in the image plane $F_1$ with the visual sight reference symbol comprising concentric circles 8 and arcs 9 about the origin, which coincide with the line of sight 10. The origin is preferably indicated by a small point indication 15. The blurred spot 16 relates to the image of the radiation source which image is unsharp in the image plane $F_1$ but sharply defined in the image plane $F_2$. In this case it is supposed that the wavelength of the radiation emitted by the radiation source is within the visible region of the spectrum. It may be preferable, however, to allow the wavelength of the transmitted radiation to be outside the visible region of the spectrum, with no blurred image appearing in the image plane $F_1$.

FIG. 4 shows a view of the glass surface located in the image plane $F_2$ with the measuring mask 11, which consists of a glass plate having a dichroic geometrical pattern superimposed thereon. A coating layer 12 has been applied and so arranged such that the entire surface is transparent to visual light but partially opaque to radiation emitted by the radiation source. By designing the boundary line 17 of the opaque layer in a special way, information about the position of the radiation source can be derived from the relation between the occuring fluctuations of the radiation and the angular position of the mask.

In order to obtain an accurate measurement of the position of the radiation emitting object it is important that the boundary line 17, ie. the transition between the transparent part 16 and the opaque part 12 of the mask, be clearly-defined. In practice, however, this is difficult to achieve, as the dichroic layer consists of several thin dielectric layers disposed on the top of each other. As a result a transition zone is provided between the transparent and opaque parts of the mask, in which zone the transmission changes from a high value to a low value.

Figure 5:
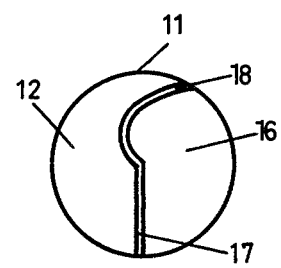
FIG. 5 is an enlarged view of the measuring device.

How the edge sharpness of the dichroic layer can be improved and the transition zone be diminished, is illustrated in FIG. 5.

The edge of the layer adjoining the transparent part is provided with a metallic layer 18 extending along the boundary line of the layer and which layer is so narrow that it does not disturb the transparency when the measuring mask is rotating. The edge layer preferably consists of a metal having a high accuracy form, for instance aluminium.

We claim:

1. An optical system for determining the angular deviation of a radiation source from a line of sight extending between a target object and said optical system, and comprising:
    optical sensor means for projecting an image of said target object in a first image plane and for projecting an image of said radiation source in a second image plane spaced from said first image plane;
    transparent prism means for receiving and directing said image of said target object toward an ocular and for receiving and directing said image of said radiation source toward a detector assembly;
    sighting means located within said first image plane for visually aligning said optical sensor means with said target object; and
    masking means located within said second image plane for selectively blocking said image of said radiation source from reaching said prism means.

2. An optical system according to claim 1, wherein said optical sensor means comprises an objective lens assembly having a first focal length for visual lightwaves passing therethrough, and a second, different focal length for radiation waves passing therethrough, whereby said first image plane is located at said first focal length and second image plane is located at said second focal length.

3. An optical system according to claim 2, wherein said radiation source comprises a laser diode emitter.

4. An optical system according to claim 2 wherein said optical sensor means further comprises a transparent plate positioned such that a first side portion of said plate is located in said first image plane and a second, opposite side portion of said transparent plate is located in said second image plane of said objective lens.

5. An optical system according to claim 4, wherein said transparent plate is formed of a glass-like material.

6. An optical system according to claim 4, wherein said sighting means comprises a visual reference symbol imposed on said first side portion of said transparent plate, with said reference symbol and said image of said target object being alignable with one another within said first image plane to establish a line of sight between said target object and said objective lens assembly.

7. An optical system according to claim 2, wherein said masking means comprises a dichroic layer of specific geometrical shape imposed on a portion of said second side portion located at said second image plane, with said dichroic layer being transparent to visual light and opaque to radiation emitted from said radiation source, to selectively block the image of said radiation source from reaching said prism means.

8. An optical system according to claim 2, wherein said optical sensor means further comprises a first transparent plate having a first side portion located at said first image plane, and a second transparent plate spaced from said first plate and having a first side portion located at said second image plane.

9. An optical system according to claim 8, wherein said first side portions of each of said plates face one another and are spaced from one another.

10. An optical system according to claim 8, wherein said first and second transparent plates are mounted within said optical system for joint horizontal and vertical movement;
and said second transparent plate is further mounted for rotation about a transverse axis extending through said plates.

11. An optical system according to claim 10, wherein said masking means comprises a dichroic layer of specific geometrical shape imposed on a portion of the first side of said rotatable plate located within said second image plane, with said dichroic layer being transparent to visual light and opaque to radiation emitted from said radiation source, to selectively block the image of said radiation source from reaching said prism means and said detector assembly.

12. An optical system according to claim 11, wherein a narrow metal strip forms a boundary between said dichroic layer and the remaining side portion to improve the sharpness of the boundary portion of said dichroic layer.

13. An optical system according to claim 12, wherein said narrow metal strip is formed of aluminum.

14. An optical system according to claim 8, wherein said sighting means comprises a visual reference symbol imposed on the first side portion of said first transparent plate for aligning said image of said target object with said objective lens.

* * * * *